Jan. 23, 1934.   R. P. HECKER   1,944,603
THEATRICAL ROPE LOCKING DEVICE
Filed Feb. 7, 1933
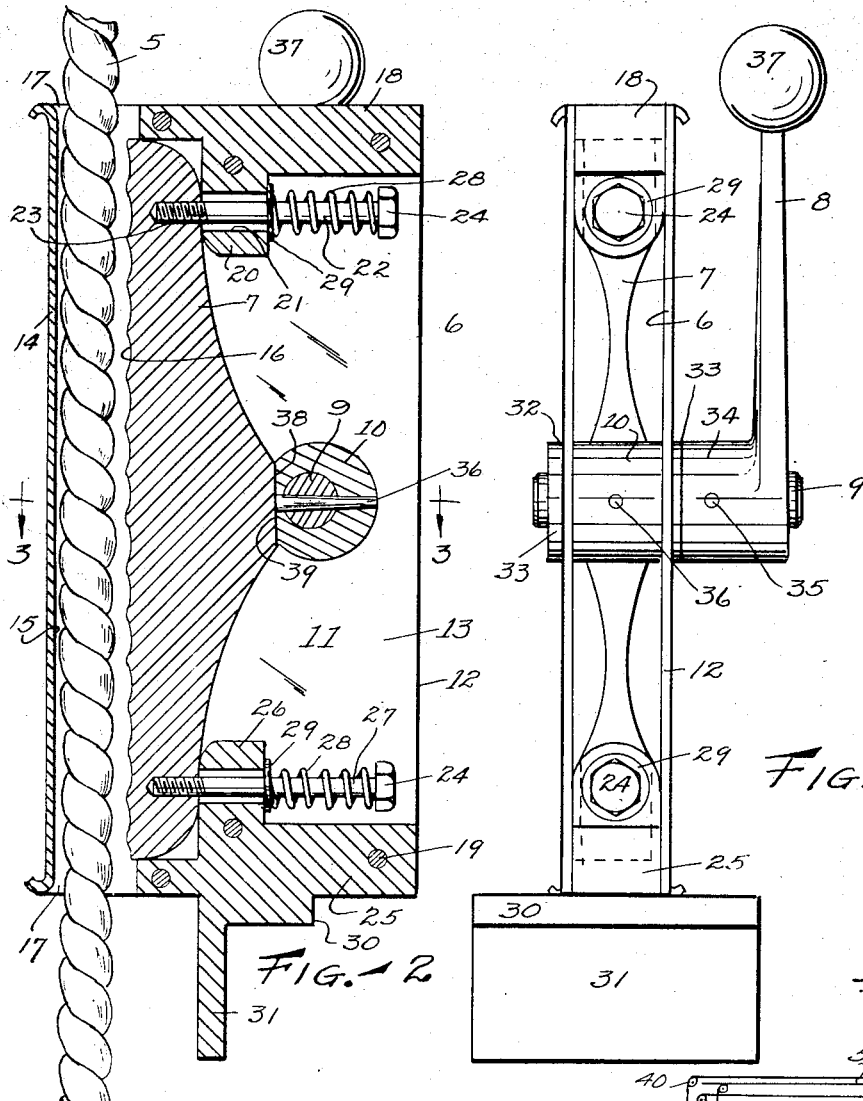
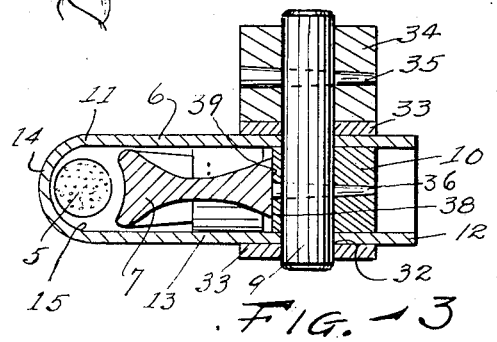
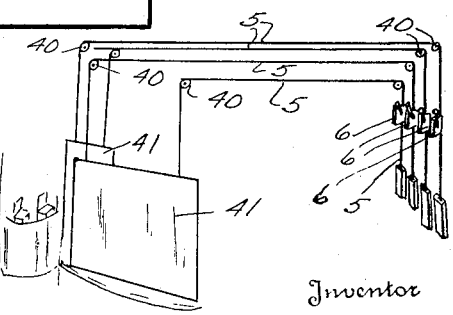
Inventor
RUSSELL P. HECKER
By Frank D. Gray
    Attorney Patented Jan. 23, 1934

1,944,603

UNITED STATES PATENT OFFICE 1,944,603

THEATRICAL ROPE LOCKING DEVICE

Russell P. Hecker, Cleveland Heights, Ohio

Application February 7, 1933. Serial No. 655,611

5 Claims. (Cl. 24—136)

My invention relates to theatrical rope locking devices, and has particular reference to such devices for installation in theatrical stages for controlling the movement of draperies, and various other stage fixtures to which the ropes to be controlled are attached, while the farther ends of such strands at their opposite positions may be manually controlled singly or in groups, while the intermediate portions are suitably guided over pulleys or other anti-friction supports to actuate such fixtures under the view of the manipulator.

It is a special object of my invention to provide an elongated friction locking device which shall have therein a curved inside surface throughout the length of the same to receive a rope strand therethrough, ordinarily directed vertically, and having an elongated brake block mounted therein and suitably guided toward and away from the strand, spring coils being mounted within the hollow locking device designed to normally hold the brake withdrawn from the strand, and a transverse cam member operable against the brake to shift the latter into braking position against the strand, while opposing the force of the coils.

It is a further object of my device to provide a brake shoe having relatively long edge surface for contact with the rope strand, though having a thickness but little greater than that of the rope so as to serve to distribute the friction strain over a large surface of the rope; and to make use of a shaft for actuating the cam by a lever provided with a manual ball handle to operate the lever.

It is a still further object of my device to actuate the brake from said shaft having the cam provided with eccentric mounting providing a flat surface normally contacting a flat surface of the brake shoe, and the major portion of the cam arc opposed the flat surface, so that as the flat surfaces separate in operation, the larger portion of greater radius will continue actuation of the shoe in the braking action.

With the above and other objects in view, my invention consists in the structure and features described in the specification, recited in the claims, and illustrated in the accompanying drawing, in which,—

Figure 1 is a front view in elevation of the brake shell and shoe with actuating mechanism;

Figure 2 is a vertical section taken in a plane indicated by the line 2—2 of Fig. 1;

Figure 3 is a transverse sectional view taken in the plane indicated by the line 3—3 of Fig. 2,— and Figure 4 is a perspective view of a detailed arrangement of a series of rope locking devices connected with stage fixtures controlled therefrom by rope strands.

Referring in detail to the drawing, 5 designates a strand of rope a short section of which is to be guided in vertical movement and controlled by its movement through an elongated, hollow shell 6 having a brake shoe 7 therein mounted for defined movement toward and away from the rope section 5 by manual actuation of a crank lever 8 which is mounted on said shell 6 for rocking a cross shaft 9 carrying a cam 10 thereon for the purpose of crowding the shoe toward the rope strand.

The guide shell 6 comprises a metal plate 11 bent on a vertical axis integrally into parallelism at its rear edges 12 to provide spaced plate portions 13 between which the vertical shoe 7 will be guided toward the rope 5. The intermediate curved portion 14 of the plate thereby provides a partially circular or cylindrical guide tube 15 for the rope, the forward edge 16 of the shoe facing the rope and completing the closure of the rope in the guide. The upper and lower edges of the portion 14 of the plate are bent somewhat outwardly to insure a smooth surface for the entrance and withdrawal of the strand at 17. The inner surface of the stationary tube 15 will present a smooth surface for the rope while the front edge 16 of the shoe will be vertically corrugated to present an uneven surface against the rope to further increase the friction between parts.

The shells will each be stationarily mounted on suitable frame structure singly or in groups, as desired.

At the ends of the shell or case 6, blocks are fixed between the edges 12 of the plate 11 to properly secure the ends spaced, as well as provide suitable mounting for the brake shoe 7. The upper block 18 is secured in the case opening by cross pins 19, the forward end of the block being spaced from the wall 14 about even with the surface 16 of the shoe. An apertured lug 20 extends into the case and receives through its aperture 21 a pin 22 screw-threaded into the upper and rear end of the shoe at 23, while the rear end of the pin 22 normally extends rearwardly from the aperture 21 and is provided with an enlarged head 24 between which and the lug 20 a coiled spring is mounted to function as a pressure means to hold the brake back against the lug, but yieldingly.

The lower block 25 is secured in the case by similar pins 19, and has upwardly-extending an apertured lug 26 through which a threaded screw pin 27 is inserted and is provided with a similar coil spring 28, in the same manner as explained in describing the pin 22 for the upper end of the shoe. A similar coiled spring 28 is mounted on the upper pin 22. Washers 29 encircle the screw pins and receive the thrust of the coils 28. The lower block or plug 25 has a stepped lower surface to provide a shoulder 30, and is further provided with a downwardly-extending flange 31 which may serve to mount the entire case 6 rigidly upon some suitable frame member, not shown in these views.

Alined apertures 32 in the plate portions 13 serve to mount the cross shaft 9 for rotation therein, washers 33 being carried by the shaft on the outer surface of the case. The lever 8 is integral with a cylindrical hub 34 which is secured to a longer outer end of the shaft 9 by locking pin 35.

Within the case 6 the cam 10 is secured upon the shaft 9 by pin 36, so that rocking of the lever 8 will rock the cam on the shaft 9. At the outer end of the shaft 8 a ball 37 is mounted for convenient manual operation of the cam. The cam 10 is provided on its lateral surface of shortest radius with a flat surface 38 normally abutting a vertical and elongated flat surface 39 at the rear of the brake shoe 7. It will therefore result that the cam arc of greater radius will not engage the surface 39, until the flat surface 38 has moved beyond face engagement with the shoe surface 39.

The structure before explained indicates that a shoe 7 will be normally held yieldingly by the coils 28 out of engagement with the rope and against the lugs 20 and 26, while rocking of the cam 10 intermediate the lugs will oppose the tendency of such coils and force the brake against the rope to deter its movement through the case. In operation a series of such shells 6 may be mounted in parallelism to operate a series of strands 5 guided over pulleys 40 to stage fixtures 41 intended to be shifted in vertical movement. The ends of the strands below the brakes may be counter-weighted, but such details are not shown in these views.

Having fully described my invention, what I now claim as new and desire to secure by Letters Patent is:

1. A rope locking device comprising an elongated metal case having parallel lateral walls, having a curved and closed edge forming an inner curved surface for guiding a rope therethrough, and an open opposite edge, in combination with an elongated vertical brake shoe movable within the shell toward and from the rope, end blocks for the shell having inwardly extending lugs horizontally apertured and forming shoulders at the forward edge of the lugs to receive the ends of the shoe, yielding releasing means guided by said blocks and secured to said shoe and including pins movable through said apertures, and cam means operable intermediate the blocks for opposing the releasing action of said yielding means and advancing the shoe into gripping engagement with the rope.

2. A rope locking device comprising an elongated metal case having parallel lateral walls, one of the vertical edges of the case having a curved inside surface, in combination with a vertically elongated brake shoe movable within the shell toward and away from said curved inside surface, the latter and the forward edge of the shoe forming together a substantially tubular opening through the shell for guiding a rope therethrough, guide blocks secured in the upper and lower ends of the shell and having inwardly extending lugs horizontally apertured and integral with the blocks, releasing pins movable through said lug apertures and secured detachably to the rear edges of the shoe coil springs mounted on the rear ends of said pins and acting against the lugs to normally but yieldingly hold the shoe against the forward edges of the lugs, and manually operable means for opposing the releasing action of said pins and forcing the shoe into gripping engagement with the rope and the latter against said inner curved surface.

3. A rope locking device comprising an elongated metal case having spaced lateral walls, having a curved and closed edge forming an inner curved surface for guiding a rope therethrough, in combination with an elongated vertical brake shoe movable within the shell toward and from the rope, end blocks for the shell provided with inwardly extending lugs horizontally apertured and forming shoulders at the forward edge of the lugs, to receive the ends of the shoe and thereby limit the vertical and horizontal position of the shoe, yielding releasing means for the shoe including pins movable through the said lug apertures and secured to said shoe, and cam means operable intermediate the blocks for opposing the releasing action of said yielding means and advancing the shoe.

4. A rope locking device comprising an elongated metal case having spaced lateral walls and a curved and closed edge forming an inner curved surface for guiding a rope therethrough, in combination with an elongated vertical brake shoe movable within the shell toward and from the rope, and having a vertically flat rear surface intermediate its ends, end blocks for the shell having yielding releasing means guided by said blocks and secured to said shoe ends, and cam mechanism operable for crowding said shoe toward the rope and the latter against the said inner curved surface, said mechanism including a cam mounted for rocking on a horizontal axis at the rear of said flat rear surface of said shoe, said cam having a flat surface in normal contact with the corresponding surface of the shoe, whereby the rotation of the cam will move the shoe rapidly initially toward the rope until in contact therewith, and thereafter at a slower rate but with increased pressure, and actuating means for the cam mechanism.

5. A rope locking device comprising an elongated metal case having parallel lateral walls, one of the vertical edges of the case having a curved inside surface, in combination with a vertically elongated brake shoe movable within the shell toward said curved inside surface, the latter and the forward edge of the shoe forming together a substantially tubular opening through the shell for guiding a rope therethrough, guide blocks secured in the upper and lower ends of the shell and having yielding releasing means secured to the shoe for normally withdrawing the shoe from the rope in said opening, and manually operable cam means adjacent the rear edge of the shoe for opposing the releasing action of said yielding means and forcing the said shoe into gripping engagement with the rope and the latter against said curved surface.

RUSSELL P. HECKER.